March 5, 1968 — D. H. MABEY — 3,371,452
DIAMOND SAW OR MILLING BLADES
Filed Feb. 8, 1965
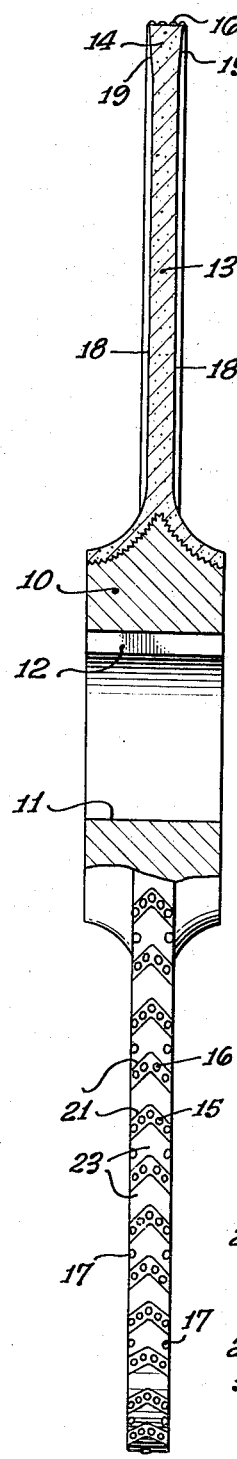
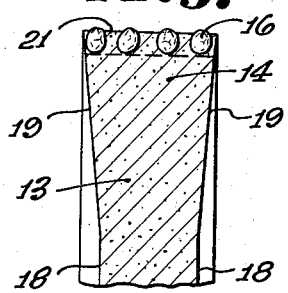
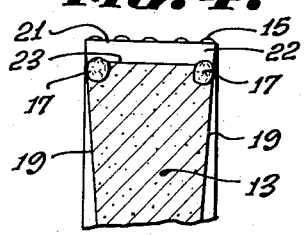
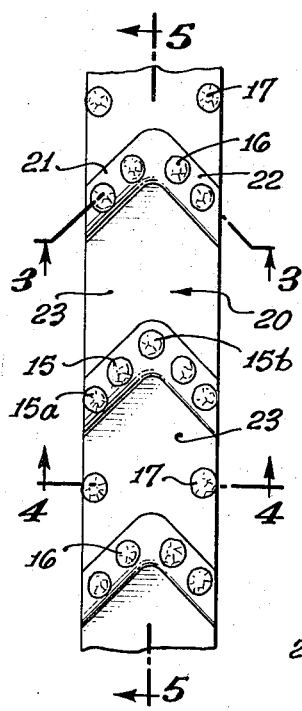
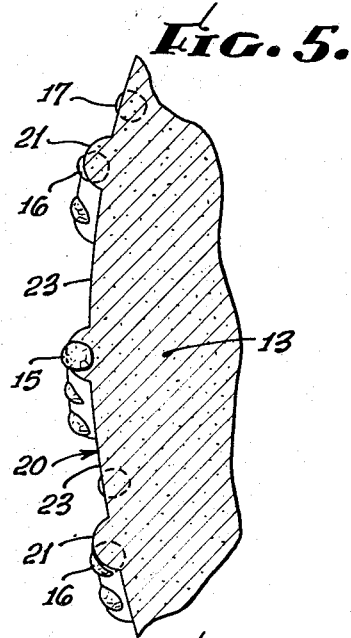
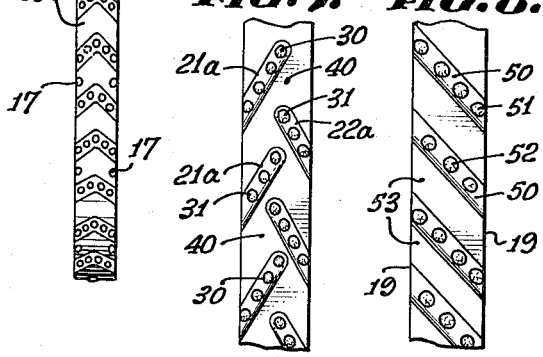
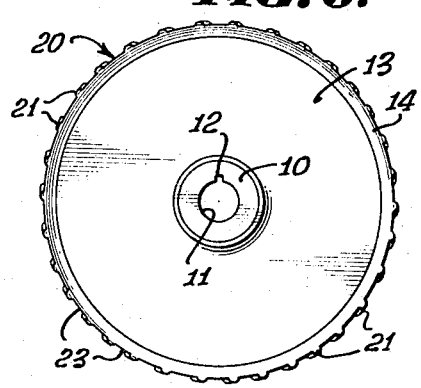
INVENTOR.
DONALD H. MABEY
BY Bernard Kriegel
ATTORNEY

United States Patent Office 3,371,452
Patented Mar. 5, 1968

3,371,452
DIAMOND SAW OR MILLING BLADES
Donald H. Mabey, Salt Lake City, Utah, assignor to Christensen Diamond Products Company, Salt Lake City, Utah, a corporation of Utah
Filed Feb. 8, 1965, Ser. No. 430,817
13 Claims. (Cl. 51—206)

ABSTRACT OF THE DISCLOSURE

A cutting saw device in which a circular disc is surrounded with a rim portion of matrix material having circumferentially spaced helical ridges of matrix material in which individual diamond cutting elements are embedded by being molded in and surrounded by the matrix material of the ridges.

---

The present invention relates to saw blades, and more particularly to saw blades for cutting ceramics, concrete, glass tank refractories, and other like materials.

There are serious disadvantages associated with the use of diamond impregnated saws, that is, saws in which the cutting rim portions comprise a mixture of diamond grit and a suitable matrix. When used in cutting extremely hard, dense materials, such as ceramics and glass tank refractories, the severing of a piece of material can only be accomplished by taking a plurality of shallow cuts. Deeper cuts should not be taken because of inefficient cooling by a flushing liquid of the saw and of the material to be severed, as well as very poor removal of the waste cuttings by the flushing liquid. The saws operate at high rotational speeds, causing their vibration and overheating. The matrix holding the diamond grit should be compounded to the abrasive characteristics of each material to be cut, limiting the extent of use of a particular saw.

An object of the present invention is to provide a saw capable of taking a deep cut with a single pass in the material being operated upon. In effect, the saw functions as a milling tool in taking the deep cut, rather than as an abrasive or grinding type of device.

A further object of the invention is to provide a saw capable of taking a deep cut in the material and of operating at a comparatively slow speed, thereby reducing vibration and insuring smooth saw operation.

Another object of the invention is to provide a saw in which the diamonds and matrix are readily cooled and maintained in a clean condition, and in which the cuttings can be freely flushed away from the region of the cut during the cutting action. In fact, the saw is self cleaning, as it continually wipes the groove cut in the material of waste cuttings.

An additional object of the invention is to provide a saw in which the diamonds or stones are placed thereon in such manner as to have maximum stone use with a minimum number of stones.

Yet another object of the invention is to provide a saw with individual diamonds or stones placed in its rim matrix portion in such manner that each diamond or stone has one of its cutting points placed on a full circular gauge dimension so that all stones in the saw take the same uniform chip load in the material being cut.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURE 1 is a combined sectional and end elevational view of a diamond saw blade embodying the invention;

FIG. 2 is an enlarged end elevational view of a portion of the saw blade illustrated in FIG. 1;

FIG. 3 is a section taken along the line 3—3 on FIG. 2;

FIG. 4 is a section taken along the line 4—4 on FIG. 2;

FIG. 5 is a section taken along the line 5—5 on FIG. 2;

FIG. 6 is a side elevational view of the saw disclosed in FIG. 1 on a reduced scale;

FIG. 7 is an end elevational view of a portion of another specific embodiment of the invention;

FIG. 8 is an end elevational view of a fragment of still another form of the invention.

The saw or milling tool illustrated in FIGS. 1 to 6, inclusive, includes an annular hub 10 having a central bore 11 through which a shaft (not shown) or other driving member can pass, the hub being secured to the shaft for rotation therewith by means of a suitable key (not shown) to be disposed in a keyway 12 in the hub. The hub is suitably secured to the blade portion 13 of the saw or milling tool. In the form specifically illustrated, such blade portion or body may be made entirely of matrix material furnace-bonded to the hub 10, with the rim portion 14 having surface-set diamonds or stones 15, 16, 17 molded or embedded therein. The matrix material may, for example, include tungsten carbide, the diamonds being set in the rim portion of the matrix in a desired pattern, as described herein below. The sides 18 of the blade portion are parallel to each other and normal to the axis of rotation of the saw, the rim portion 14, which is made of matrix material, having laterally outwardly divergent sides 19 to insure working clearance during the taking of a cut in the particular material to be operated upon.

The peripheral portion 20 of the circular saw or milling tool has a plurality of inclined ridges 21, 22 formed therein which are circumferentially spaced from one another, and in which the diamonds or stones 15, 16 are secured. The ridges are raised substantially above the intervening periphery of the rim portion to provide waterways 23 therebetween through which flushing and cooling fluid, such as water, can pass during operation of the saw in the work. As shown, each ridge 21, 22 is inclined at a substantial angle in helical, herringbone, or chevron fashion to the plane of the saw blade, extending both circumferentially and axially of the saw blade, the diamonds or stones being embedded in each of such ridges. As disclosed specifically in the drawings, the stones 15 in one ridge are spaced from one another along the length of the ridge, the outer stones 15a extending to the sides of the ridge, and an intermediate stone 15b being disposed at the apex portion of the ridge. The stones 16 in the next ridge arcuately around the circumference of the saw are staggered with respect to the stones 15 of the previously described ridge so that the stones in one ridge overlap the stones of the other ridge to insure that the full longitudinal surface of the material being cut will be covered by the saw blade diamonds. Actually, as illustrated in FIGS. 1 and 2, the arrangement of stones 15, 16 alternate from one ridge to the next succeeding ridge, each stone or diamond having its radially outermost cutting point on the same cylindrical surface so that all of the stones in the tool take the same uniform chip load during its rotation in the work in taking a severing cut or in cutting a groove.

As assurance that appropriate clearance for the saw blade will be cut in the work, diamonds or stones 17 are also embedded or molded in the peripheral portion of the rim between ridges 21, 22. As an example, kicker or gauge stones or diamonds are inserted in each waterway 23 at the sides 19 of the rim portion, and such kicker stones may, by the way of example, be disposed in alternate waterways.

Although the circular saw blade illustrated has its blade portion 13 and rim portion 14 made of matrix material, if desired, only the rim portion 14 may be made of matrix material, the blade portion being made of steel, or the like, from which the hub 10 is also normally made.

The double helical, chevron, or herringbone pattern of the raised ridges 21, 22 of matrix material and the diamond cutting elements 15, 16 set therein results in a saw in which the raised diamonds are free to bite deeply into the material being cut, with no matrix clearance problems chronic to impregnated types of saws. The raised matrix and diamonds present a lesser area engaging the work, and thereby allow cutting or milling to take place with lower pressures or forces of the blade against the work, actually resulting in an acceleration in the penetration rate of the blade into the work.

During rotation of the saw in cutting the work, the pattern of the ridges and diamonds produces a self-cleaning action, since the ridges are continually wiping the cutting groove in the work of waste cuttings. The coolant and flushing liquid, which may be water, can pass relatively freely through the waterways 23 in cooling the rim portion 14 and cleaning it of cuttings, and in maintaining the diamonds, 15, 16, 17, ridges, 21, 22, and the remainder of the rim portion in a cool and clean condition. Thus, the diamonds are exposed and unhampered by cuttings, penetrating into the work, and contributing significantly to the ability of the saw to take a relatively deep single cut in the work. By way of comparison, it is found that diamond impregnated saws cutting in hard, dense materials, such as ceramics, can only effectively take a relatively shallow cut of from about ⅛-inch to ¼-inch. The present saws can take a single cut that is much deeper, being, for example, of the order of ½-inch to 1-inch per cut, and even greater.

It is also found that saws made as illustrated in the drawings not only cut a deeper groove at a faster rate, but they perform such action with a minimum number of diamonds or stones, and such diamonds or stones continue their effective cutting over a much longer period; that is to say, the diamond saw has a much greater useful life. It is also found that a single saw can cut a wide variety of materials very effectively, as distinguished from a diamond impregnated saw which requires different matrices for effectively cutting different types of materials. The much lower speeds at which the saw operates, which are actually milling speeds, as distinguished from grinding wheel speeds, minimizes the tendency of the circular saw to vibrate and also overheating of the saw. Any heat generated is effectively cooled by the highly effective flushing action of the coolant and flushing liquid.

In the form of invention illustrated in FIG. 7, the ridges 21a, 22a and diamonds are arranged in a specifically different pattern from that shown in FIGS. 1 to 5. A double helical or herringbone ridge pattern is shown, in which one set of ridges 21a extending inwardly from a side of the rim is inclined in one direction and another set 22a is inclined in the opposite direction extending inwardly from the opposite rim side. The ridges and sets of diamonds 30, 31 embedded in the ridges are offset circumferentially with respect to one another, the inner portions of the ridges 21a, 22a overlapping one another axially of the blade. The diamonds 30, 31 in one set of ridges 21a are in staggered relation with respect to one another, but still overlap one another to some extent, which is also true of the diamonds 30, 31 in the other set of ridges 22a. Thus, in alternate ridges of each set, one diamond 30 will be disposed at a side of the rim portion and other diamonds 30 are disposed along its ridge toward the opposite side of the rim portion. The stones 31 in intervening ridges will commence slightly inwardly of the side, occupying any circumferential space or gap between the spaced stones 30 of the previously described ridge. Thus, the full axial length of the rim portion will have diamonds or stones available for performing a cutting action in the work being operated upon.

With the pattern of raised ridges and diamonds embedded therein, as illustrated in FIG. 7, their inclination produces a self-cleaning action of the saw in the work by removing the waste cuttings therefrom, in effect, lifting the cuttings out of the groove. The flushing liquid can pass relatively freely through the waterways 40 between the raised ridges, effectively maintaining the work free from cuttings and cooling and cleaning the saw blade, and more particularly its rim portion, ridges, and the stones or diamonds embedded in the latter.

In the specific embodiment of invention illustrated in FIG. 8, a single helical set of raised ridges 50 is provided on the rim portion of the matrix, the diamonds or stones 51, 52 being embedded in such ridges. The stones or diamonds 51 in alternate ridges are spaced from one another and are in staggered relation axially of the saw with respect to the stones or diamonds 52 in the next succeeding ridge. The stones 51 in alternate ridges will extend to the sides 19 of the rim to insure the cutting of the proper gauge clearance for the saw, so that its cutting into the material being operated upon will not be impeded. As with the other patterns of raised ridges and surface-set diamonds or stones, the embodiment illustrated in FIG. 8 has waterways 53 between the ridges 50 through which the flushing fluid can pass in carrying the cuttings from the material being operated upon, and in keeping the ridges and diamonds cool and clean of the cuttings, for most effective operation upon the work.

I claim:

1. In a cutting saw: a supporting disc having a rim portion comprising matrix material; said rim portion having circumferentially spaced raised helical ridges of matrix material extending along its periphery and providing waterways therebetween; and cutting elements embedded in said ridges, said cutting elements being molded in and surrounded by the matrix material of said ridges and collectively extending from side to side of said disc.

2. In a cutting saw: a supporting disc having a rim portion comprising matrix materials, said rim portion having ridge means extending along its periphery of matrix raised above the adjacent periphery of said rim portion to provide waterways therebetween and inclined to the plane of said disc; and spaced cutting elements embedded in said ridge means in axial overlapping relation to each other to collectively provide cutting elements along the entire axial extent of said rim portion, said cutting elements being molded in and surrounded by the matrix material of said ridge means.

3. In a cutting saw: a supporting disc having a rim portion comprising matrix material; said rim portion having circumferentially spaced raised helical ridges of matrix material extending along its periphery and providing waterways therebetween; and individual diamond cutting elements embedded in said ridges and spaced from one another, said cutting elements collectively extending along the entire axial extent of said rim portion, said cutting elements being molded in and surrounded by the matrix material of said ridges.

4. In a cutting saw: a supporting disc having a rim portion comprising matrix material, said rim portion having ridge means extending along its periphery of matrix material raised above the adjacent periphery of said rim portion to provide waterways therebetween and inclined to the plane of said disc; and spaced individual diamond cutting elements embedded in said ridge means in axial overlapping relation to each other to collectively provide diamond cutting elements along the entire axial extent of said rim portion, said cutting elements being molded in and surrounded by the matrix material of said ridge means.

5. In a cutting saw: a supporting disc having a rim comprising matrix material; said rim portion having circumferentially spaced raised helical ridges of matrix material disposed around the full periphery of said rim portion and inclined at a substantial angle to the central plane of said disc, said raised ridges extending along the periphery of said rim portion and providing waterways therebetween; and individual diamond cutting elements embedded in said ridges and spaced from one another, said cutting elements overlapping one another circumferentially of said rim portion and collectively extending along the entire axial extent of said rim portion from one of its sides to its opposite side, said cutting elements being molded in and surrounded by the matrix material of said ridges.

6. In a cutting saw: a supporting disc having a rim portion comprising matrix material; said rim portion having circumferentially spaced raised double helical ridges of matrix material extending along its periphery and providing waterways therebetween; and cutting elements embedded in said ridges, said cutting elements being molded in and surrounded by the matrix material of said ridges and collectively extending from side to side disc.

7. In a cutting saw: a supporting disc having a rim portion comprising matrix material; said rim portion having circumferentially spaced raised double helical ridges of matrix material extending along its periphery and providing waterways therebetween; and cutting elements embedded in said ridges, said cutting elements being molded in and surrounded by the matrix material of said ridges and collectively extending from side to side of said disc, said double helical ridges comprising a first set of generally parallel ridges extending inwardly from one side of said rim portion and a second set of generally parallel ridges extending inwardly from the opposite side of said rim portion and circumferentially offset with respect to said first set.

8. In a cutting saw: a supporting disc having a rim portion comprising matrix material; said rim portion having circumferentially spaced raised double helical ridges of ridges of matrix material extending along its periphery and providing waterways therebetween; cutting elements embedded in said ridges, said cutting element being molded in and surrounded by the matrix material of said ridges and collectively extending from side to side of said disc; said double helical ridges being parallel to each other and also being of chevron form.

9. In a cutting saw: a supporting disc having a rim portion comprising matrix material; said rim portion having circumferentially spaced raised single helical ridges of matrix material parallel to each other and extending along its periphery from one side of said rim porton to its opposite side, said spaced ridges providing waterways therebetween; and cutting elements embedded in said ridges, said cutting elements being molded in and surrounded by the matrix material of said ridges and collectively extending from side to side of said disc.

10. In a cutting saw: a supporting disc having a rim portion comprising matrix material; said rim portion having circumferentially spaced raised helical ridges of matrix material disposed around the full periphery of said rim portion and inclined at a substantial angle to the central plane of said disc, said raised ridges extending along the periphery of said rim portion and providing waterways therebetween; and individual diamond cutting elements embedded in said ridges and spaced from one another, said cutting elements being molded in and surrounded by the matrix material of said ridges, said cutting elements overlapping one another circumferentially of said rim portion and collectively extending along the entire axial extent of said rim portion from one of its sides to its opposite side; and cutting elements in at least some of said waterways at the sides of said rim portion.

11. In a cutting saw: a supporting disc having a rim portion comprising matrix material; said rim portion having circumferentially spaced raised double helical ridges of matrix material disposed around the full periphery of said rim portion and inclined at a substantial angle to the central plane of said disc, said raised ridges extending along the periphery of said rim portion and providing waterways therebetween; and individual diamond cutting elements embedded in said ridges and spaced from one another, said cutting elements overlapping one another circumferentially of said rim portion and collectively extending along the entire axial extent of said rim portion from one of the sides to its opposite side, said cutting elements being molded in and surrounded by the matrix material of said ridges.

12. In a cutting saw: a supporting disc having a rim portion comprising matrix material; said rim portion having circumferentially spaced raised double helical ridges of matrix material disposed around the full periphery of said rim portion and inclined at a substantial angle to the central plane of said disc, said raised ridges extending along the periphery of said rim portion and providing waterways therebetween; individual diamond cutting elements embedded in said ridges and spaced from one another, said cutting elements overlapping one another circumferentially of said rim portion and collectively extending along the entire axial extent of said rim portion from one of the sides, said cutting elements being molded in and surounded by the matrix material of said ridges to its opposite sides; said double helical ridges comprising a first set of generally parallel ridges extending inwardly from one side of said rim portion and a second set of generally parallel ridges extending inwardly from the opposite side of said rim portion and circumferentially offset with respect to said first set.

13. In a cutting saw: a supporting disc having a rim portion comprising matrix material; said rim portion having circumferentially spaced raised double helical ridges of matrix material disposed around the full periphery of said rim portion and inclined at a substantial angle to the central plane of said disc, said raised ridges extending along the periphery of said rim portion and providing waterways therebetween; individual diamond cutting elements embedded in said ridges and spaced from one another, said cutting elements overlapping one another circumferentially of said rim portion and collectively extending along the entire axial extent of said rim portion from one of the sides to its opposite side, said cutting elements being molded in and surrounded by the matrix material of said ridges; said double helical ridges being parallel to each other and also being of chevron form.

References Cited
UNITED STATES PATENTS

| | | | |
|---|---|---|---|
| 1,029,406 | 6/1912 | Staynes | 51—403 X |
| 1,097,565 | 5/1914 | Straubel | 51—206 |
| 2,136,359 | 11/1938 | Bley | 125—39 X |
| 3,154,894 | 11/1964 | Dawkins | 51—267 X |
| 3,220,148 | 11/1965 | Christensen | 51—206 |

FOREIGN PATENTS

| | | |
|---|---|---|
| 22,500 | 7/1921 | France. |
| 403,159 | 12/1933 | Great Britain. |

LESTER M. SWINGLE, *Primary Examiner.*

D. G. KELLY, *Assistant Examiner.*